(12) United States Patent
Ono (10) Patent No.: US 7,383,456 B2
(45) Date of Patent: Jun. 3, 2008

(54) METHOD OF AUTONOMOUSLY CONTROLLING POWER TO RESPECTIVE UNITS OF AN INFORMATION PROCESSING APPARATUS

(75) Inventor: Yoshiyuki Ono, Hino (JP)

(73) Assignee: Seiko Epson Corporation, Tokyo (JP)

( * ) Notice: Subject to any disclaimer, the term of this patent is extended or adjusted under 35 U.S.C. 154(b) by 277 days.

(21) Appl. No.: 11/154,639

(22) Filed: Jun. 17, 2005

(65) Prior Publication Data

US 2006/0026445 A1 Feb. 2, 2006

(30) Foreign Application Priority Data

Aug. 2, 2004 (JP) .............................. 2004-225162

(51) Int. Cl.
*G06F 1/26* (2006.01)
(52) U.S. Cl. .................. 713/320; 713/300; 713/324; 713/330; 395/750
(58) Field of Classification Search ................ 713/300, 713/320, 324, 330; 395/750
See application file for complete search history.

(56) References Cited

U.S. PATENT DOCUMENTS

| | | | |
|---|---|---|---|
| 5,452,401 A * | 9/1995 | Lin .............................. | 713/322 |
| 5,655,124 A * | 8/1997 | Lin .............................. | 713/322 |
| 6,535,985 B1 | 3/2003 | Oshima et al. | |
| 6,782,483 B2 | 8/2004 | Oshima et al. | |
| 6,792,552 B2 | 9/2004 | Oshima et al. | |
| 6,795,929 B2 | 9/2004 | Oshima et al. | |
| 6,804,791 B2 | 10/2004 | Oshima et al. | |
| 6,839,855 B2 | 1/2005 | Oshima et al. | |
| 6,882,389 B2 | 4/2005 | Oshima et al. | |
| 6,909,483 B2 | 6/2005 | Oshima et al. | |
| 6,941,481 B2 | 9/2005 | Oshima et al. | |
| 6,952,248 B2 | 10/2005 | Oshima et al. | |
| 6,952,787 B2 | 10/2005 | Oshima et al. | |
| 6,971,037 B2 | 11/2005 | Oshima et al. | |
| 6,990,595 B2 | 1/2006 | Oshima et al. | |
| 7,006,181 B2 | 2/2006 | Oshima et al. | |

(Continued)

FOREIGN PATENT DOCUMENTS

JP  A-04-211819  8/1992

(Continued)

*Primary Examiner*—Thomas Lee
*Assistant Examiner*—Malcolm D Cribbs
(74) *Attorney, Agent, or Firm*—Oliff & Berridge, PLC (57) ABSTRACT

With a state in which electric power is not supplied to respective functional units as a basis, an information processing apparatus is capable of performing power control to supply electric power to the respective functional units to cause the functional units to perform processing only when the functional units are required to be operated and, after the end of the processing, stop the supply of electric power. Therefore, in particular, it is also possible to set the state in which electric power is not supplied as a basis for a CPU, a leak current of which causes a problem. This is more advantageous in terms of a circuit size and easiness of control than applying power control to the respective functional units. Moreover, since the state in which electric power is not supplied is set as a basis, processing for shift of a state is reduced and, when operation is performed, it is possible to speed up a response to the operation compared with the time when a suspend mode or the like is used.

5 Claims, 4 Drawing Sheets

U.S. PATENT DOCUMENTS

| | | |
|---|---|---|
| 7,024,572 B2 | 4/2006 | Oshima et al. |
| 7,062,667 B2 | 6/2006 | Oshima et al. |
| 7,073,084 B2 | 7/2006 | Oshima et al. |
| 7,079,108 B2 | 7/2006 | Oshima et al. |
| 7,080,272 B2 | 7/2006 | Oshima et al. |
| 7,120,809 B2 | 10/2006 | Oshima et al. |
| 7,213,162 B2 | 5/2007 | Oshima et al. |
| 2002/0087900 A1* | 7/2002 | Homewood et al. ........ 713/320 |
| 2003/0193466 A1 | 10/2003 | Oshima et al. |
| 2004/0027173 A1 | 2/2004 | Hoshi et al. |
| 2004/0027466 A1* | 2/2004 | Mizobuchi ............... 348/231.4 |
| 2004/0142725 A1* | 7/2004 | Kim ........................ 455/556.1 |
| 2005/0128176 A1 | 6/2005 | Oshima et al. |
| 2005/0128177 A1 | 6/2005 | Oshima et al. |
| 2005/0128178 A1 | 6/2005 | Oshima et al. |
| 2005/0128179 A1 | 6/2005 | Oshima et al. |
| 2005/0168400 A1 | 8/2005 | Oshima et al. |
| 2007/0028086 A1 | 2/2007 | Oshima et al. |
| 2007/0061560 A1 | 3/2007 | Oshima et al. |
| 2007/0061604 A1 | 3/2007 | Oshima et al. |
| 2007/0136566 A1 | 6/2007 | Oshima et al. |

FOREIGN PATENT DOCUMENTS

| | | |
|---|---|---|
| JP | A-08-234872 | 9/1996 |
| JP | A 09-114557 | 5/1997 |
| JP | A-2000-315127 | 11/2000 |
| JP | A-2002-055743 | 2/2002 |
| JP | A-2002-149292 | 5/2002 |
| JP | A 2004-295193 | 10/2004 |
| KR | 1999-0024834 | 7/1999 |
| KR | 1999-0048882 | 7/1999 |
| KR | 1999-0073440 | 10/1999 |

* cited by examiner

METHOD OF AUTONOMOUSLY CONTROLLING POWER TO RESPECTIVE UNITS OF AN INFORMATION PROCESSING APPARATUS

BACKGROUND OF THE INVENTION

1. Field of the Invention

The present invention relates to an information processing apparatus that is capable of autonomously controlling supply of electric power inside the apparatus and a power control method for the information processing apparatus.

2. Description of the Related Art

In recent years, in the field of the computer system technology, power control techniques for reducing power consumption at standby time by stopping, supply of electric power inside an apparatus when processing is not performed and resuming the supply of electric power instantaneously when processing is required, for example, when input operation is applied to the apparatus have been developed.

For example, as a portable device such as a Personal Digital Assistant (PDA), there is known one that reduces power consumption at the standby time. When operation is not performed for a fixed time, the portable device automatically shifts to a low power consumption mode for operating a CPU at a low frequency and stopping supply of electric power to peripheral circuits and, when operation is performed, the CPU returns to an ordinary state to perform processing.

A general personal computer (PC) has functions such as a suspend mode and a standby mode. In particular, in a battery-driven device such as a notebook PC, the suspend mode or the standby mode is effective for reduction of unnecessary power consumption at the time when the PC is not used for a long time.

Note that a technique concerning power control such as the suspend mode and the standby mode is disclosed in JP9-114557A.

However, in the conventional power control technique, as a premise, electric power is supplied to a CPU and other functional units (a display, a memory, etc.) in a normal state of use. Power consumption is reduced only under a specific condition, for example, when a fixed time elapses from immediately preceding operation.

Therefore, usually, regardless of the fact that some of the units are not operating in an apparatus, electric power is supplied to the respective units until the specific condition is met, for example, until the fixed time elapses from immediately preceding operation. This causes unnecessary power consumption.

For example, when it is evident that the apparatus is operated by a user intermittently, more specifically, in an apparatus in which, as a premise, an electronic book is inspected and operation for turning a page is performed at certain time intervals, unnecessary electric power is supplied to some units, which are not operating, among units of the apparatus until a fixed time elapses after the operation for turning a page.

On the other hand, in order to reduce unnecessary power consumption, it is conceivable to use the standby mode or the suspend mode.

However, in recent years, shrinkage of a semiconductor process has been in progress, which causes an increase in a leak current. In the standby mode, power consumption due to a leak current of a CPU is innegligible at the standby time when an apparatus is put in a HALT state.

In addition, in the suspend mode, since a fixed time is required for returning to an operation mode. Thus, operation performed by a user cannot be executed promptly.

SUMMARY OF THE INVENTION

It is an object of the invention to perform power control in an information processing apparatus more appropriately.

In order to solve the problems, the invention provides an information processing apparatus that autonomously controls supply of electric power in respective functional units forming the apparatus. The information processing apparatus has plural management domains, which include the predetermined functional units (e.g., a CPU 20, a ROM 30, a NVRAM 40, a RAM 50, a GA 60, a display controller 70, a memory card controller 80, a communication controller 90, etc. in FIG. 2) and serve as control units in supplying electric power (e.g., a CPU domain, a nonvolatile domain, a volatile domain, a rendering domain, a memory card domain, a communication domain, etc. in FIG. 2), formed therein. The information processing apparatus includes: a power control unit (e.g., a power management circuit 10 in FIG. 2) that is capable of supplying electric power to each of the power management domains; an execution control unit (e.g., the CPU 20 in FIG. 2) that supplies electric power to the power management domain including the functional unit related to execution of an inputted instruction using the power control unit to execute the instruction and stops the supply of electric power to the power management domain in response to the end of the execution of the instruction in the functional unit; and an event management unit (e.g., the power management circuit 10 in FIG. 2) that supplies electric power to the power management domain including the execution control unit in response to the input of the instruction using the power control unit, notifies the execution control unit of a content of the inputted instruction, and stops the supply of electric power to the power management domain including the execution control unit in response to the end of the execution of the instruction in the execution control unit.

When an instruction is inputted to the information processing apparatus, the event management unit supplies electric power to the power management domain including the execution control unit and notifies the power management domain of a content of the instruction. The execution control unit supplies electric power to the power management domain including the functional unit related to the execution of the instruction and causes the functional unit to execute the instruction in accordance with the content of the instruction. When the execution of the instruction in the functional unit ends, the execution control unit stops the supply of electric power to the power management domain. When the execution of the instruction in the execution control unit ends, the event management unit stops supply of electric power to the power management domain including the execution control unit.

Such a constitution makes it possible to, with a state in which electric power is not supplied to the respective functional units as a basis, perform power control for, only when the functional units are required to operate, supplying electric power to cause the functional units to perform processing and, after the end of the processing, stopping the supply of electric power.

Therefore, it is also possible to set the state in which electric power is not supplied as a basis for the execution control unit including a processor, in particular, a leak current of which causes a problem. This is more advantageous in terms of a circuit size and easiness of control than applying power control to the respective functional units. Moreover, since the state in which electric power is not supplied to the respective functional units is set as a basis, processing for shift of a state is reduced and, when operation is performed, it is possible to speed up a response to the operation compared with the time when the suspend mode or the like is used.

In other words, it is possible to perform power control in the information processing apparatus more appropriately.

When an inputted instruction is for performing processing of plural steps using the plural functional units included in the different power management domains, the execution control unit repeatedly supplies electric power to the power management domains in an order of processing of the steps to execute the instruction and stops the supply of electric power in response to the end of the execution of the instruction to thereby execute processing of the plural steps.

Such a constitution makes it possible to, even if an inputted instruction is for performing processing using a part of the functional units of the information processing apparatus sequentially, perform power control appropriately.

The information processing apparatus at least includes, as the power management domains, at least one of a nonvolatile domain including a functional unit for storing information in a nonvolatile manner and a volatile domain including a functional unit for storing information in a volatile manner, an execution control domain including the execution control unit, and a display domain including a functional unit for display of information. The event management unit supplies electric power to the execution control domain, the nonvolatile domain, and the volatile domain in response to the input of the instruction. The execution control unit receives notification of a content of the inputted instruction from the event management unit and, when information is displayed in execution of the instruction, supplies electric power to the display domain to display the information.

Such a constitution makes it possible to, in displaying information in the information processing apparatus, when the different functional units perform processing such as readout of data to be displayed and rasterizing of rendering data, supply electric power only to the necessary functional units and perform processing sequentially. Thus, it is possible to reduce power consumption.

The information processing apparatus includes, as the functional unit, a display unit with a memory capability that holds displayed information in a nonvolatile manner.

Such a constitution makes it possible to further reduce power consumption, for example, when the information processing apparatus is constituted as an electronic book reader having a display body with a memory capability.

The invention also provides a power control method in an information processing apparatus that autonomously controls supply of electric power in respective functional units forming the apparatus. The power control method includes: forming plural power management domains, which include the predetermined functional units and serve as control units in supplying electric power, in the information processing apparatus; when an instruction is inputted to the information processing apparatus, supplying electric power to the power management domain including the functional unit related to execution of the instruction to execute the instruction; and stopping the supply of electric power to the power management domain in response to the end of the execution of the instruction in the functional unit.

In this way, according to the invention, it is possible to perform power control in the information processing unit more appropriately.

DETAILED DESCRIPTION OF THE PREFERRED EMBODIMENTS

An embodiment of an information processing apparatus according to the invention will be hereinafter explained with reference to the accompanying drawings.

First, a structure of the information processing apparatus will be explained.

Figure 1:
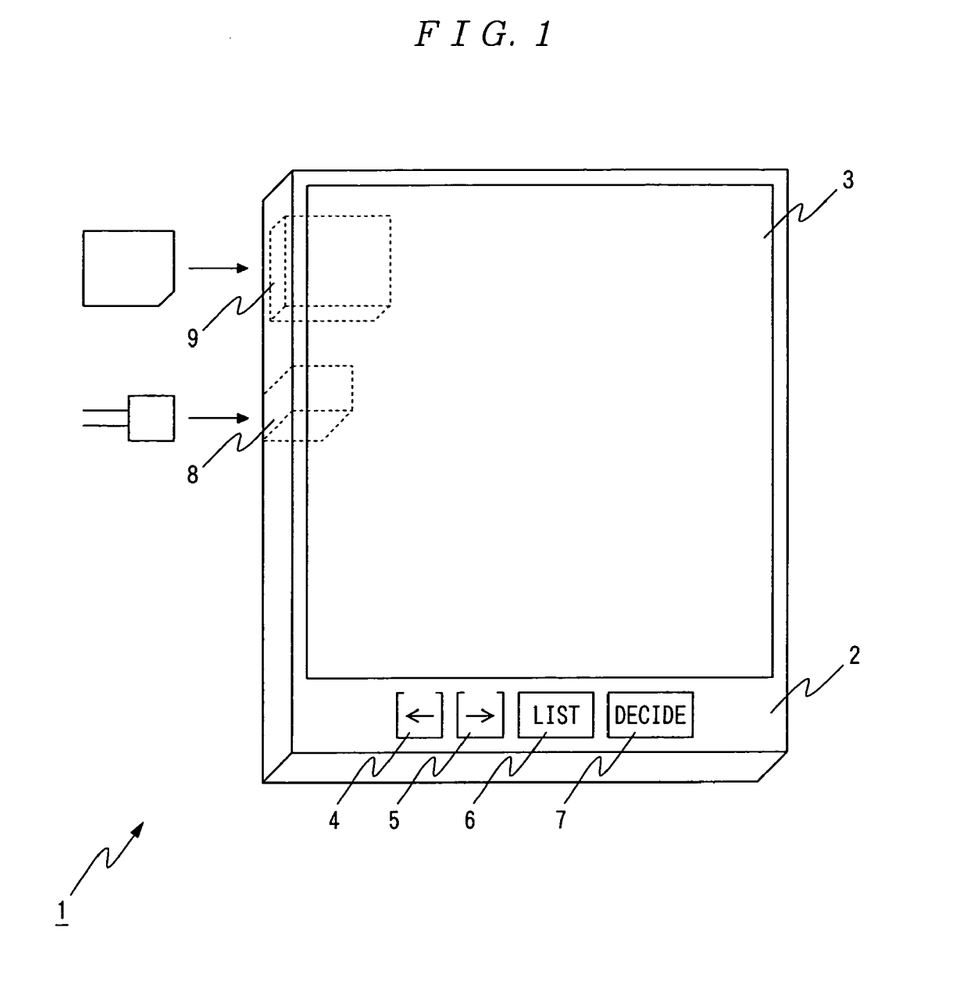
FIG. 1 is a diagram showing an external structure of an information processing apparatus 1 according to the invention.

FIG. 1 is a diagram showing an external structure of an information processing apparatus 1 according to the invention.

Note that, in this embodiment, the information processing apparatus 1 constituted as an electronic book reader for inspecting contents of an electronic book will be explained.

In FIG. 1, the information processing apparatus 1 includes a main body 2, a display 3, a page turn-back button 4, a page turn-forward button 5, a list display button 6, a decision button 7, a communication connector 8, and a memory card slot 9.

The main body 2 includes respective functional units forming the information processing apparatus 1. The display 3, the page turn-back button 4, the page turn-forward button 5, the list display button 6, and the decision button 7 are provided on a front surface thereof. The communication connector 8 and the memory card slot 9 are provided on a left side thereof. The main body 2 also includes devices for realizing respective functions such as a CPU 20 or a display controller 70 described later.

The display 3 is constituted by a display device of, for example, an A4 size having a high pixel density (a large number of pixels). The display 3 displays pixel data on predetermined pixels according to control of the display controller 70.

The display 3 also serves as a display device with a memory capability (a display device in which a display screen is maintained even if a power supply is disconnected). Therefore, since electric power is unnecessary to maintain a state of the display screen, it is possible to further reduce power consumption of the information processing apparatus 1.

Note that it is possible to adopt as the display 3, for example, an electrophoretic display, a cholesteric liquid crystal display, a display using a charged toner, a display using a twist ball, or an electro-deposition display.

The page turn-back button 4 is a button for turning back a page displayed at present to a previous page. The page turn-forward button 5 is a button for turning forward a page displayed at present.

The list display button 6 is a button for displaying pages, which are included in a content stored in a memory card, as a list. Note that data of reduced screens of the respective pages (hereinafter referred to "reduced screen data") is stored as pages for display as a list in the content stored in the memory card.

The decision button 7 is a button for selecting a page that a user displays on a full screen.

Depression signals of the page turn-back button 4, the page turn-forward button 5, the list display button 6, and the decision button 7 are inputted to the CPU 20 via a power management circuit 10 described later.

The communication connector 8 is a connector for connecting a Universal Serial Bus (USB) cable. The communication connector 8 makes it possible to receive transmission and reception of information or supply of electric power via a connected communication cable.

The memory card slot 9 is an interface for reading information from and writing information in a memory card. When a memory card storing a content of an electronic book is inserted in the memory card slot 9, it is possible to read the content stored in the memory card.

Next, an internal structure of the information processing apparatus 1 will be explained.

Figure 2:
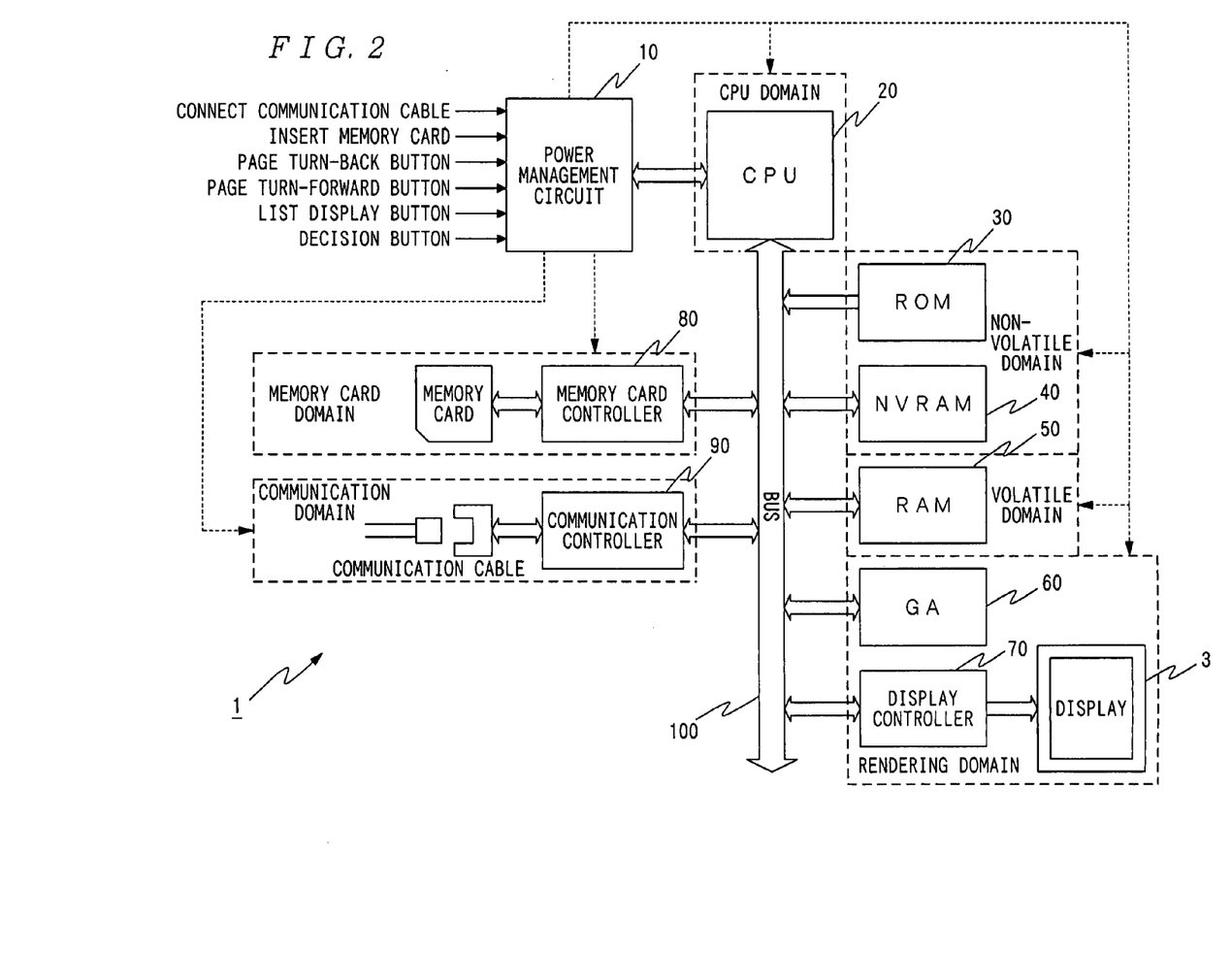
FIG. 2 is a functional block diagram showing an internal structure of the information processing apparatus 1.

FIG. 2 is a functional block diagram showing an internal structure of the information processing apparatus 1.

In FIG. 2, the information processing apparatus 1 includes a power management circuit 10, a Central Processing Unit (CPU) 20, a Read Only Memory (ROM) 30, a Non-volatile RAM (NVRAM) 40, a RAM 50, a graphic accelerator (GA) 60, a display controller 70, a memory card controller 80, and a communication controller 90. Note that the respective units excluding the power management circuit 10 are connected by a bus 100. The power management circuit 10 is connected to the CPU 20 directly. In addition, the power management circuit 10 is connected to respective power management domains (described later) by power supply lines (indicated by dotted lines in the figure) for supplying electric power.

The respective functional units in the information processing apparatus 1 form plural groups concerning supply of electric power. First, the groups (hereinafter referred to as "power management domains") will be explained.

The information processing apparatus 1 according to the invention is an apparatus that, with a state in which electric power is not supplied to the respective functional units as a basis, performs power control for, only when the functional units are required to operate, supplying electric power to cause the functional units to perform processing and, after the processing ends, stopping the supply of electric power.

In this case, in executing processing corresponding to an inputted instruction, the information processing apparatus 1 supplies electronic power to an identical power management domain as a unit, wherein the identical power management domain is consisted of functional units having a functionally close relation such as functional units that are highly likely to operate simultaneously, functional units that perform a series of processing, or the like. The information processing apparatus 1 controls supply of electric power to the power management domain independently from other power management domains.

In this way, the information processing apparatus 1 regards functional units having a functionally close relation as functional units belonging to an identical power management domain and performs power control for the identical power management domain. This is more advantageous in terms of a circuit size and easiness of control than applying power control to the respective functional units.

In the functional structure shown in FIG. 2, from the viewpoint described above, a CPU domain including the CPU 20, a nonvolatile domain including the ROM 30 and the NVRAM 40, a volatile domain including the RAM 50, a rendering domain including the GA 60, the display controller 70, and the display 3, a memory card domain including the memory card controller 80, and a communication domain including the communication controller 90. The power management circuit 10 controls power supply with these respective domains as units.

The respective functional units shown in FIG. 2 will be explained.

The power management circuit 10 receives electric power supplied from a not-shown battery and supplies electric power to a predetermined power management domain.

Specifically, the power management circuit 10 receives a depression signal of the page turn-back button 4, the page turn-forward button 5, the list display button 6, or the decision button 7 or a signal of detection of connection of a communication cable in the communication connector 8 or insertion of a memory card in the memory card slot 9. Then, the power management circuit 10 supplies electric power to the CPU 20 for which supply of electric power is stopped. The power management circuit 10 transmits a signal indicating an event that has taken place, that is, indicating that a depression signal of which button has been inputted, connection of the communication cable has been detected, or connection of the memory card has been detected (hereinafter referred to as "event notification signal") to the CPU 20 which activates when the supply of electric power is resumed.

When supply of electric power to any one of the power management domains is instructed by the CPU 20, the power management circuit 10 supplies electric power to the power management domain. When stop of supply of electric power to any one of the power management domains is instructed by the CPU 20, the power management circuit 10 stops the supply of electric power to the power management domain.

The CPU 20 controls the entire information processing apparatus 1. The CPU 20 reads out and executes various programs stored in the ROM 30. For example, the CPU 20 reads out programs for various kinds of processing in system control processing of the information processing apparatus 1 described later from the ROM 30 and executes the programs in response to various signals inputted via the power management circuit 10. Then, the CPU 20 stores results of the various kinds of processing in a predetermined area of the NVRAM 40 or the RAM 50.

The ROM 30 is constituted by a nonvolatile memory such as a flash ROM. An operating system program (OS) and application programs for a viewer of an electronic book and the like are stored in the ROM 30.

The NVRAM 40 is constituted by a nonvolatile memory such as a Ferroelectric Random Access Memory (FRAM) or a Magnetoresistive Random Access Memory (MRAM). Data, which is required to be saved even when a power supply of the information processing apparatus 1 is disconnected, is stored in the NVRAM 40. For example, when a content of an electronic book is inspected, a page number of a page being inspected is stored.

Note that, as described above, it is possible to constitute the NVRAM 40 with a nonvolatile memory that does not require backup by a power supply as described above. Besides, it is also possible to adopt a pseudo-nonvolatile memory obtained by backing up a volatile memory such as a SRAM with a dedicated power supply.

The RAM 50 is constituted by a volatile memory such as a Dynamic Random Access Memory (DRAM), a Static Random Access Memory (SRAM), or a Synchronous DRAM (SDRAM). The RAM 50 forms a work area when the CPU 20 executes processing. In addition, the RAM 50 stores a result of the processing.

Note that, in the explanation of this embodiment, it is assumed that the information processing apparatus 1 includes the RAM 50 taking into account high speed of processing because, in general, the RAM 50 operates faster than the NVRAM 40. However, if it is possible to use the NVRAM 40 operating at higher speed, the NVRAM 40 may be used to function as the RAM 50. In this case, the RAM 50 does not have to be provided.

The GA 60 is hardware that performs rendering processing for an image, which is displayed on the display 3, at high speed in accordance with an instruction of the CPU 20. Specifically, the GA 60 performs processing for expanding a vector figure inputted from the CPU 20 into a raster figure. Then, the GA 60 outputs rendering data for rendering a figure, which is subjected to rendering processing, on the display 3 to the display controller 70.

The display controller 70 controls the display 3 directly to display the rendering data inputted from the GA 60.

Specifically, the display controller 70 refers to the rendering data inputted from the GA 60 and drives an X driver and a Y driver of the display 3 to thereby cause the display 3 to display the raster figure that is a rendering object.

Next, an operation of the information processing apparatus 1 in this embodiment is turned on only when an operation is necessary, for example, when input operation is performed in the constitution described above. When the necessary operation ends, the information processing apparatus 1 is turned off. In this case, electric power is supplied to only a power management domain, which is required to be operated, according to a content of the input operation.

System control processing for realizing such processing will be hereinafter explained.

Figure 3:
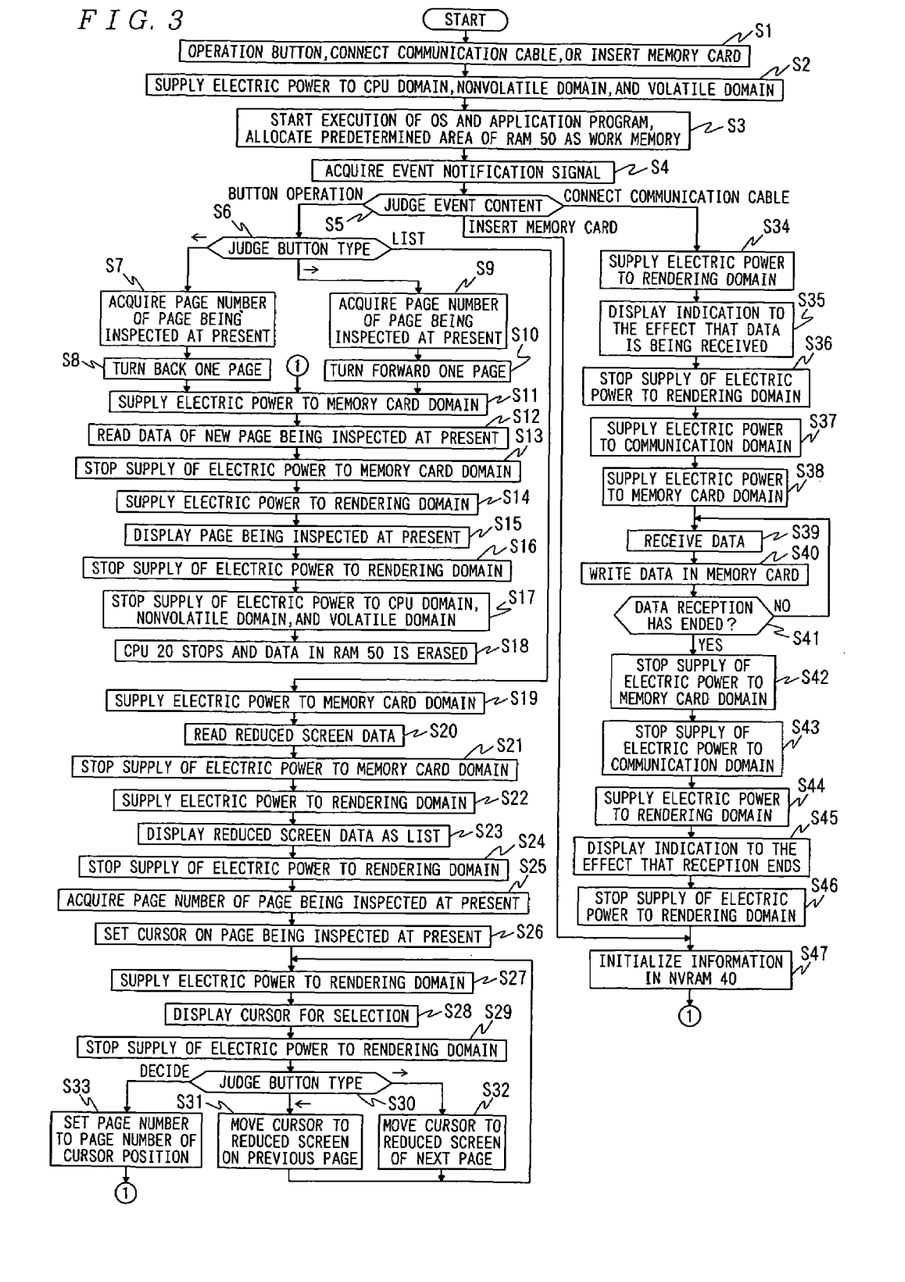
FIG. 3 is a flowchart of system control processing that is executed by the information processing apparatus 1.
Figure 4A:
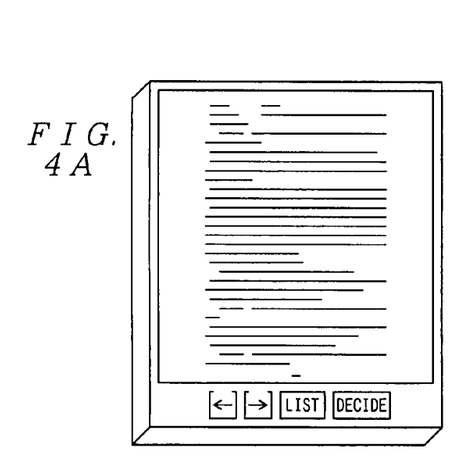
FIGS. 4A to 4E are diagrams showing examples of a display screen in system control processing.
Figure 4B:
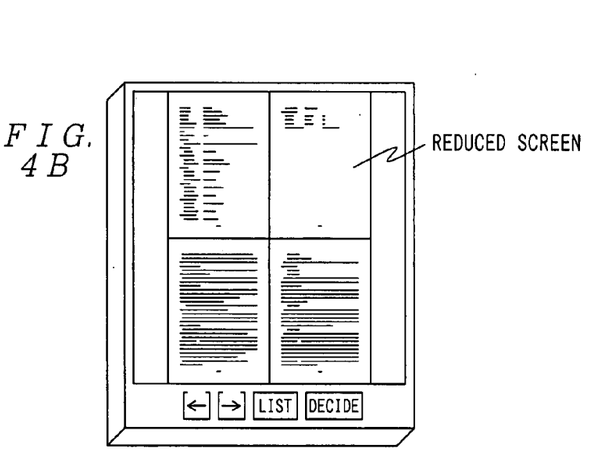
Figure 4C:
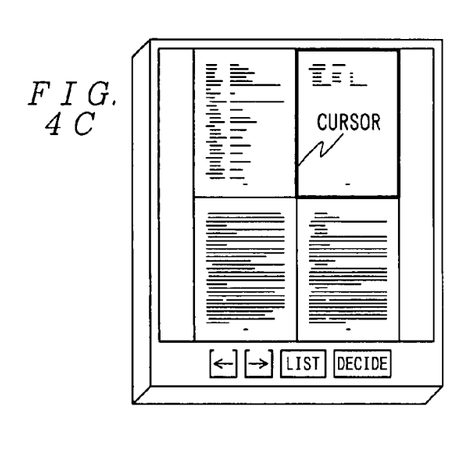
Figure 4D:
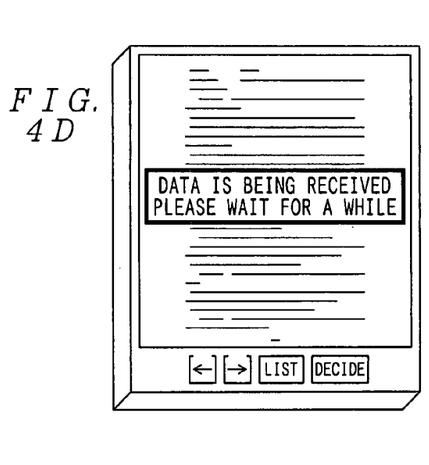
Figure 4E:
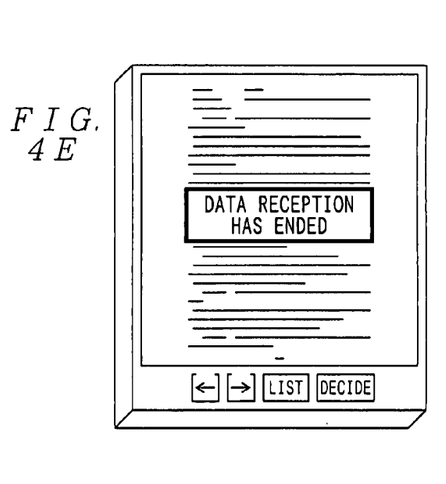

FIG. 3 is a flowchart of system control processing that is executed by the information processing apparatus 1.

FIGS. 4A to 4E are diagrams showing examples of a display screen in the system control processing. The system control processing will be hereinafter explained with reference to the display screen shown in FIGS. 4A to 4E.

In FIG. 3, when a user operates one of the buttons, connects the communication cable, or inserts a memory card (step S1), the power management circuit 10 supplies electric power to the CPU domain, the nonvolatile domain, and the volatile domain (step S2).

Then, the CPU 20 starts execution of the OS and the application program stored in the ROM 30 and allocates a predetermined area of the RAM 50 as a work memory (step S3).

Next, the CPU 20 acquires an event notification signal from the power management circuit 10 (step S4) and judges a content of an event that has taken place (step S5).

When it is judged in step S5 that the event that has taken place is input operation for one of the buttons, the CPU 20 judges a type of the button subjected to the input operation (step S6).

When it is judged in step S6 that the page turn-back button 4 is subjected to the input operation, the CPU 20 acquires a page number of a page being inspected at present from the NVRAM 40 (step S7) and subtracts "1" from the page number to turn back the page being inspected at present by one page (step S8).

When it is judged in step S6 that the page turn-forward button 5 is subjected to input operation, the CPU 20 acquires a page number of a page being inspected at present from the NVRAM 40 (step S9) and adds "1" to the page number to turn forward the page being inspected at present by one page (step S10).

After steps S8 and S10, the power management circuit 10 supplies electric power to the memory card domain (step S11) and reads data of a new page being inspected at present from the memory card (step S12).

Then, the power management circuit 10 stops the supply of electric power to the memory card domain (step S13) and supplies electric power to the rendering domain (step S14).

Then, the CPU 20 causes the respective units of the rendering domain to display the page being inspected at present (see in FIG. 4A) (step S15). The power management circuit 10 stops the supply of electric power to the rendering domain (step S16).

Thereafter, the power management circuit 10 stops the supply of electric power to the CPU domain, the nonvolatile domain, and the volatile domain (step S17). In response to this, the CPU 20 stops and the data in the RAM 50 is erased (step S18). Note that, in step S18, the data stored in the NVRAM 40 is held even after the supply of electric power is stopped.

When it is judged in step S6 that the list display button 6 is subjected to input operation, the CPU 20 supplies electric power to the memory card domain (step S19) and reads reduced screen data for displaying pages as a list (step S20).

Then, the power management circuit 10 stops the supply of electric power to the memory card domain (step S21) and supplies electric power to the rendering domain (step S22).

The CPU 20 causes the respective units of the rendering domain to display reduced screen data as a list (see FIG. 4B) (step S23). The power management circuit 10 stops the supply of electric power to the rendering domain (step S24).

Subsequently, the CPU 20 acquires a page number of a page being inspected at present from the NVRAM 40 (step S25) and sets a cursor for page selection, which is displayed on a list display screen, on the page being inspected at present (step S26).

Then, the power management circuit 10 supplies electric power to the rendering domain (step S27). The CPU 20 causes the respective units of the rendering domain to display the cursor for page selection on a reduced screen corresponding to the page number of the page being inspected at present (see FIG. 4C) (step S28).

Subsequently, the power management circuit 10 stops the supply of electric power to the rendering domain (step S29). The CPU 20 judges a type of the button subjected to input operation by the user (step S30).

When it is judged in step S30 that the page turn-back button 4 is subjected to input operation, the CPU 20 moves the cursor for page selection to a reduced screen of the previous page (step S31). When it is judged in step S30 that the page turn-forward button 5 is subjected to input operation, the CPU 20 moves the cursor for page selection to a reduced screen of the next page (step S32).

After steps S31 and S32, the CPU 20 shifts to the processing in step S27.

When it is judged in step S30 that the decision button 7 is subjected to input operation, the CPU 20 sets a page number, which corresponds to the reduced screen on which the cursor is set, as a page number of a page being inspected at present (step S33) and shifts to the processing in step S11.

When it is judged in step S5 that the event that has taken place is connection of the communication cable, the power management circuit 10 supplies electric power to the rendering domain (step S34). The CPU 20 displays an indication to the effect that data is being received from the communication cable (see FIG. 4D) (step S35).

Then, the power management circuit 10 stops the supply of electric power to the rendering domain (step S36) and supplies electric power to the communication domain (step S37).

Next, the power management circuit 10 supplies electric power to the memory card domain (step S38) and starts reception of data (content) from the communication cable (step S39).

Subsequently, the CPU 20 writes the data received from the communication cable in the memory card (step S40) and judges whether the reception of the data has ended (step S41).

When it is judged in step S41 that the reception of the data has not ended, the CPU 20 shifts to the processing in step S39. When it is judged in step S41 that the reception of the data has ended, the power management circuit 10 stops the supply of electric power to the memory card domain (step S42).

Moreover, the power management circuit 10 stops the supply of electric power to the communication domain (step S43) and supplies electric power to the rendering domain (step S44).

Then, the CPU 20 causes the respective units of the rendering domain to display an indication to the effect that the reception of the data from the communication cable has ended (see FIG. 4E) (step S45). Subsequently, the power management circuit 10 stops the supply of electric power to the rendering domain (step S46).

Next, the CPU 20 initializes information stored in the NVRAM 40 to set a page number of a page being inspected at present to "1" (step S47) and shifts to the processing in step S11.

When it is judged in step S5 that the event that has taken place is insertion of the memory card, the CPU 20 shifts to the processing in step S47.

The information processing apparatus 1 repeats the processing described above to thereby operate in a power saving manner even if a user does not turn on and off the power supply on purpose.

As described above, with a state in which electric power is not supplied to the respective functional units as a basis, the information processing apparatus 1 according to the embodiment is capable of performing power control to supply electric power to the respective functional units to cause the functional units to perform processing only when the functional units are required to be operated and, after the end of the processing, stop the supply of electric power.

Therefore, it is also possible to set the state in which electric power is not supplied as a basis for the CPU 20, in particular, a leak current of which causes a problem. This is more advantageous in terms of a circuit size and easiness of control than applying power control to the respective functional units. Moreover, since the state in which electric power is not supplied is set as a basis, processing for shift of a state is reduced and, when operation is performed, it is possible to speed up a response to the operation compared with the time when the suspend mode or the like is used.

In short, it is possible to perform power control in the information processing apparatus 1 more appropriately.

What is claimed is:

1. An information processing apparatus that autonomously controls supply of electric power in respective predetermined functional units forming the apparatus, the information processing apparatus including plural management domains, which include the predetermined functional units and serve as control units in supplying electric power, comprising:

a power control unit that is capable of supplying electric power to each of the power management domains;

an execution control unit that directs the power control unit to supply electric power to a power management domain that includes a functional unit to execute an inputted instruction and stops supplying electric power to the power management domain at an end of execution of the instruction in the functional unit; and an event management unit that controls the power control unit to supply electric power to the execution control unit in response to an event notification signal indicating an input of the inputted instruction, notifies the execution control unit of a content of the inputted instruction, and controls the power control unit to stop supplying electric power to the power management domain that includes the execution control unit in response to an end of execution of the inputted instruction in the execution control unit, wherein the execution control unit is a CPU and electric power to the CPU is stopped based on a CPU direction to the event management unit.

2. The information processing apparatus according to claim 1, wherein, when an inputted instruction is for performing processing of plural steps using a plurality of functional units included in different power management domains, the execution control unit repeatedly directs the power control unit to supply electric power to the power management domains in an order of processing of steps to execute the inputted instruction and to stop supplying electric power in response to the end of the execution of the inputted instruction to execute processing of the plural steps.

3. The information processing apparatus according to claim 1, wherein the information processing apparatus at least includes, as the power management domains, at least one of a nonvolatile domain including a functional unit for storing information in a nonvolatile manner and a volatile domain including a functional unit for storing information in a volatile manner, an execution control domain including the execution control unit, and a display domain including a functional unit for display of inputted information;

the event management unit supplies electric power to the execution control domain, the nonvolatile domain, and the volatile domain in response to the input of the inputted instruction; and the execution control unit receives notification of the content of the inputted instruction from the event management unit and, when information is displayed while executing the inputted instruction, supplies electric power to the display domain to display the information.

4. The information processing apparatus according to claim 1, wherein the information processing apparatus includes, as the functional unit, a display unit with a memory capability that holds displayed information in a nonvolatile manner.

5. A power control method in an information processing apparatus that autonomously controls supply of electric power in respective predetermined functional units forming the apparatus, the power control method comprising:

forming plural power management domains, which include the predetermined functional units and serve as control units in supplying electric power, in the information processing apparatus;

supplying electric power to each of the power management domains by a power control unit;

when an instruction is inputted to the information processing apparatus, directing the power control unit to supply electric power to the power management domain including the functional unit related to execution of the inputted instruction using the power control unit to execute the instruction by an execution control unit;

stopping the supply of electric power to the power management domain in response to the end of the execution of the instruction in the functional unit by the execution control unit;

supplying electric power to a power management domain including the execution control unit in response to an event notification signal indicating the inputted instruction using the power control unit by an event management unit;

notifying the execution control unit of a content of the inputted instruction by the event management unit; and stopping supplying electric power to the power management domain including the execution control unit in response to the end of the execution of the instruction in the execution control unit by the event management unit, wherein the execution control unit is a CPU and electric power to the CPU is stopped based on CPU directions to the event management unit.

* * * * *